United States Patent
Mangialardi

Patent Number: 5,332,501
Date of Patent: Jul. 26, 1994

[54] APPARATUS FOR REMOVING LIQUID FROM AN AIR-LIQUID SEPARATOR

[75] Inventor: John K. Mangialardi, Seabrook, Tex.

[73] Assignee: Grumman Aerospace Corporation, Bethpage Long Island, N.Y.

[21] Appl. No.: 915,255

[22] Filed: Jul. 20, 1992

[51] Int. Cl.⁵ .................... B01D 19/00; B01D 21/26
[52] U.S. Cl. .................. 210/512.3; 55/459.1; 95/16; 96/171; 96/209; 96/214
[58] Field of Search .............. 55/459.1; 95/16; 96/171, 208, 209, 214; 210/512.1, 512.3

[56] References Cited

U.S. PATENT DOCUMENTS

| | | |
|---|---|---|
| 3,213,592 | 10/1965 | Rich . |
| 3,224,173 | 12/1965 | Webb . |
| 3,276,679 | 10/1966 | Booth . |
| 4,113,452 | 9/1978 | Brown et al. ...................... 96/208 |
| 4,904,284 | 2/1990 | Hanabusa ............................ 96/208 |
| 5,104,520 | 4/1992 | Maronde et al. ................. 210/512.3 |

Primary Examiner—Robert A. Dawson
Assistant Examiner—David Reifsnyder
Attorney, Agent, or Firm—Bacon & Thomas

[57] ABSTRACT

An apparatus for removing liquid from an air liquid separator is disclosed having a rotatable chamber in communication with the liquid collecting portion of the air-liquid separator such that liquid from the separator may enter the interior of the chamber. A drive motor is associated with the chamber to rotate the chamber such that water collects on the interior of a peripheral wall. A pitot tube extends into the interior of the chamber and has an inlet end adjacent to the inside of the peripheral wall such that water may enter the tubes as the chamber rotates. The other end of the pitot tube extends exteriorly of the apparatus. Rotation of the chamber will cause water to enter the pitot tube and pass through the tube to the exterior of the device.

8 Claims, 2 Drawing Sheets

APPARATUS FOR REMOVING LIQUID FROM AN AIR-LIQUID SEPARATOR

BACKGROUND OF THE INVENTION

The present invention relates to an apparatus for removing liquid from an air-liquid separator, more specifically such a device which eliminates the need for a separate pump in the liquid outlet line.

In low gravity or zero gravity environments, air is used to entrain and transport initially uncontained liquid. The air-liquid mixture must then be separated and the components returned to their systems for use. Cyclone or vortex-type separators are ideal for this application when large volumes of liquid or air are involved. Rotary dynamic-type separators are presently used for small volumes (less than 50 cfm of air and 1 gpm of liquid).

Vortex-type separators are well known in the art and typically comprise a generally cylindrical housing having a conically shaped bottom end wherein the air-liquid mixture is introduced into the upper portion of the housing via a generally tangentially extending inlet conduit. The circular motion of the mixture causes the heavier liquid to accumulate on the walls of the housing and drop to the conical bottom of the separator. The separated air is withdrawn from the center of the housing via an air outlet tube. The water collecting at the bottom of the housing must be removed for the device to be in continuous use.

One of the present ways of removing this accumulated liquid is to have a pump in a liquid outline line communicating with the water collecting sump. The operation of the pump is controlled by electrode sensors in the conical sump section of the vortex separator which senses when the water has accumulated to a predetermined level. Once the water reaches this level, the pump is turned on and the water pumped out of the separator. The "on" condition of the pump is timed to the volume of liquid to be discharged from the sump.

While generally successful, these systems do suffer from serious drawbacks. The electrode sensors, since they contact the water will eventually degrade, thereby rendering them ineffective or inaccurate. Also, the sensors can be fooled by the presence of air bubbles in the water to improperly indicate that no water is present. Also, this system cannot easily be related to a desired flowrate, since the pump is usually either "on" or "off".

These systems also preclude the use of common pumps, such as gear pumps or centrifugal pumps. Gear pumps cannot be utilized because of the possible presence of dirt or debris in the liquid, which would, at least, result in excessive wear of the gear pumps or possibly, render them totally ineffective. Centrifugal pumps cannot be utilized because it is possible to lose the priming fluid, thereby rendering them totally ineffective.

SUMMARY OF THE INVENTION

An apparatus for removing liquid from an air liquid separator is disclosed having a rotatable chamber in communication with the liquid collecting portion of the air-liquid separator such that liquid from the separator may enter the interior of the chamber. A drive motor is associated with the chamber to rotate the chamber such that water collects on the interior of a peripheral wall. A pitot tube extends into the interior of the chamber and has an inlet end adjacent to the inside of the peripheral wall such that water may enter the tube as the chamber rotates. The other end of the pitot tube extends exteriorly of the apparatus. Rotation of the chamber will cause water to enter the pitot tube and pass through the tube to the exterior of the device.

DETAILED DESCRIPTION OF THE PREFERRED EMBODIMENTS

Figure 1:
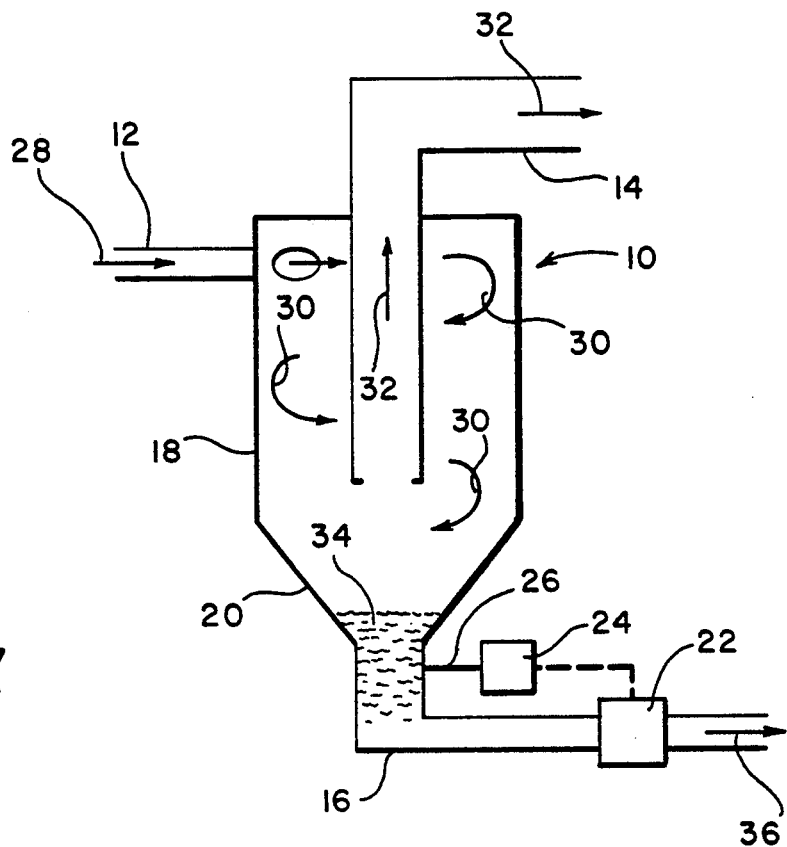
FIG. 1 is a schematic, cross sectional view of a prior art air-liquid separating system.

The known air-liquid separator system is illustrated in FIG. 1 and comprises a vortex type separator 10 having an air-liquid mixture inlet 12, an air outlet tube 14 and a liquid outlet tube 16. The vortex separator 10 has a generally cylindrical housing 18 with a frusto-conical bottom sump 20. A pump 22 is operatively associated with the liquid outlet tube 16. The operation of the pump 22 is controlled by pump control 24 which includes an electrode sensor 26 extending into the liquid collecting zone of the separator.

In use, the air-liquid mixture enters the separator 10 through the inlet 12 in the direction of arrows 28 and undergoes a helical path of motion inside the housing 18 due to the generally tangential location of the inlet tube 12. This motion is indicated by arrows 30 in FIG. 1. This helical motion causes the heavier liquid to collect on the interior of the housing 18 and pass downwardly into the conical sump section 20 to collect in the conical sump as illustrated at 34. Air is removed through the centrally located air outlet tube 14 in the direction of arrows 32.

Once the liquid 34 collected in the conical sump 20 reaches a predetermined level, it is sensed by the electrode sensor 26 which then actuates the pump 22 via the pump control 24. Liquid is pumped out of the system as indicated by arrow 36.

Figure 2:
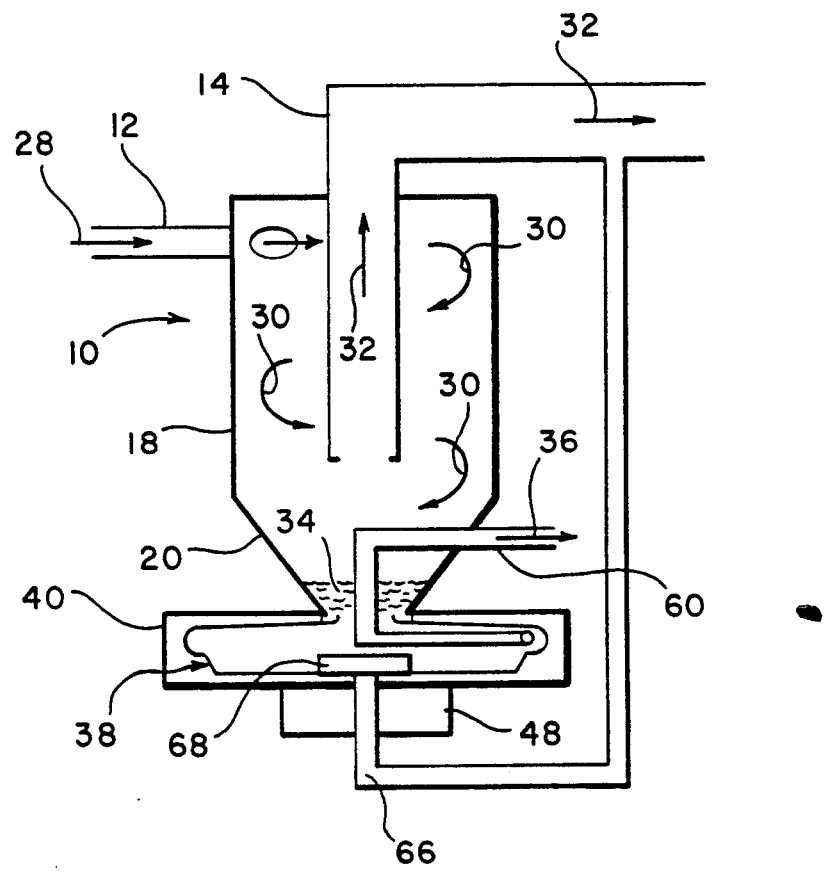
FIG. 2 is a schematic, cross sectional view of an air-liquid separating system incorporating the present invention.

FIG. 2 is similar to FIG. 1, but illustrates the apparatus according to the present invention associated with the vortex separator 10. The vortex separator 10 may be any known separator and, as in the description of FIG. 1, comprises a generally cylindrical housing 18 having a conically shaped sump portion 20. Air-liquid mixture inlet 12 communicates with the interior of the housing 18 to direct the air-liquid mixture into the housing in a generally tangential path such that it undergoes a generally helical path of movement once inside the housing 18. This is indicated by arrows 30 in FIG. 2. As previously described, the water separates from the air and collects on the inside of the housing 18 and passes, by gravity, downwardly into the conically shaped sump 20. Air is withdrawn through the air outlet tube 14 as indicated by arrows 32. The operation of the vortex type separator 10 with Applicant's invention is the same as that described in regard to the prior art illustrated in FIG. 1.

Figure 3:
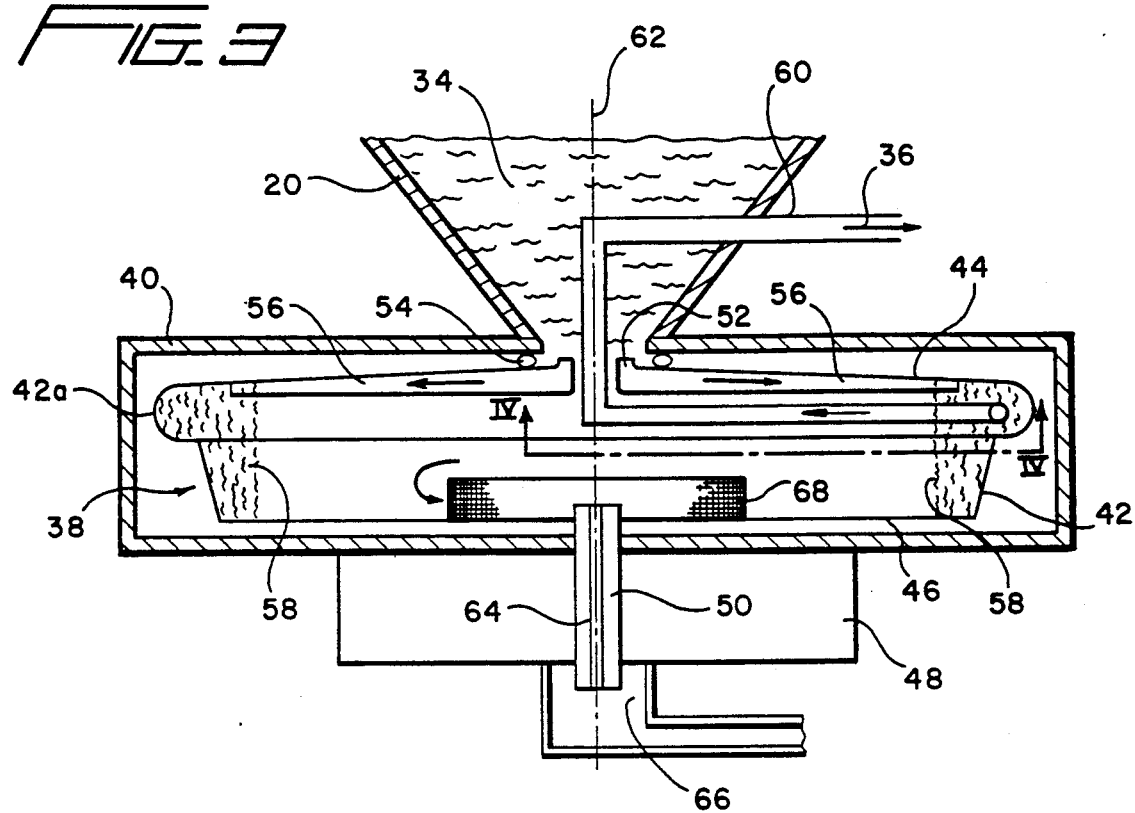
FIG. 3 is a cross sectional view of the liquid removing apparatus according to the present invention.
Figure 4:
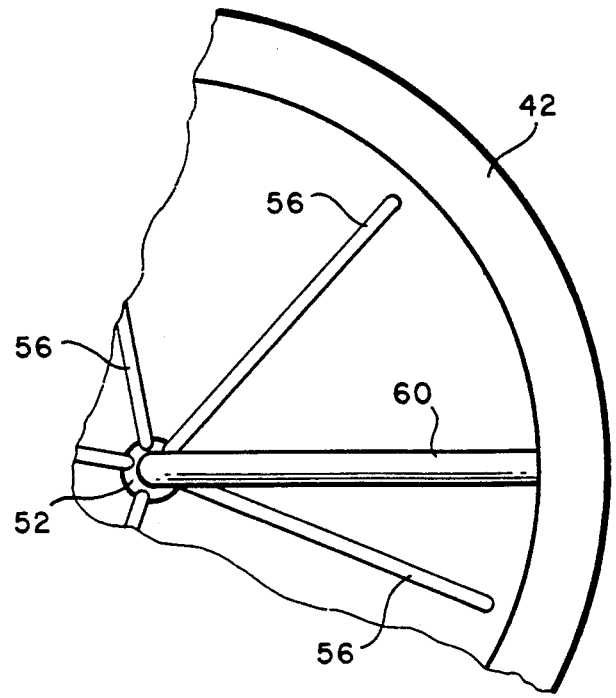
FIG. 4 is a partial view taken in the direction of arrows IV—IV in FIG. 3.

However, the apparatus according to the present invention removes the accumulated liquid from the sump 20 without the need for a separate pump. As best illustrated in FIG. 3, the apparatus comprises a chamber 38 rotatably located within stationary housing 40. Chamber 38 comprises peripheral wall 42, an upper wall 44 and a lower wall 46. As illustrated in FIG. 4, the chamber 38 is generally cylindrical in configuration.

Chamber 38 is connected to drive motor 48, which may be fixedly attached to a portion of the stationary housing 40, by drive shaft 50. The upper wall 44 of the chamber 38 defines an opening 52 which communicates with the interior of the sump portion 20 of the vortex separator 10. Any known type of seal 54 may be interposed between the upper wall 44 of the rotating chamber 38 and the housing 40 in order to prevent the liquid 34 collected in the sump 20 from entering into the interior of the stationary housing 40 outside of the rotating chamber 38.

Depending from the inside of the upper wall 44 into the interior of the rotating chamber 38 are a plurality of suction vanes 56. As illustrated in FIG. 4, the suction vanes 56 extend generally radially outwardly from the center of the rotating chamber 38 and may either be straight, as illustrated, or may be curved as necessary for each specific application.

In operation, the rotation of chamber 38 causes the suction vanes, which are designed as air moving vanes, to create a slightly reduced pressure within the chamber 38 to draw the liquid 34 from the vortex separator sump 20 into the interior of the chamber 38. The rotation of the chamber 38 causes the liquid within the chamber to collect along the interior of the peripheral wall 42, as illustrated at 58 in FIG. 3.

The peripheral wall 42 may define a liquid collecting portion 42a having a generally concave configuration facing the interior of the chamber 38. A pitot tube 60 has an inlet end extending into this concave liquid collecting portion 42a such that, as the chamber 38 rotates, water is forced into the inlet end and through the pitot tube 60. The pitot tube 60 is stationary and may pass through the upper wall 44 of the chamber 38 into the interior of the rotating chamber along the axis of rotation 62. The pitot tube 60 extends to the exterior of the device and serves to remove the liquid in the direction of arrow 36 in FIG. 3.

Any air which may be separated from the liquid within the chamber 38 may be removed through passageway 64 defined through the drive shaft 50 and directed into an air bleed passage 66. Air bleed passage 66 may communicate with the air outlet tube 14, as illustrated in FIG. 2. A filter 68 may be operatively associated with the inlet of passage 64 in the interior of the chamber 38 to prevent clogging of the passageways by any debris which may be entrained in the air. The air bleed passage also maintains a slightly negative pressure within the interior of the rotating chamber 38 to assist in the drawing of the liquid into the chamber. Once the liquid 34 is in contact with the vanes 56, the centrifugal forces will urge the water to be collected on the interior of the peripheral wall 42.

As can be seen, the present invention eliminates the need of any sensing device to detect the water level and eliminates the problems inherently associated with such sensing systems. The apparatus also eliminates the need for external pumps, while retaining the advantages of large flow capacity vortex separators. The invention retains the positive pumping features of rotary separators without the drawbacks of the relatively low flow capacity of these rotary separators.

The foregoing description is provided for illustrative purposes only and should not be construed as in any way limiting this invention, the scope of which is defined solely by the appended claims.

I claim:

1. Apparatus for removing liquid from an air-liquid separator having a liquid collecting portion and an air discharge tube, the device comprising:
  a) means defining a chamber having a peripheral wall and an interior space in communication with the liquid collecting portion of the air-liquid separator such that liquid in the liquid collecting portion may enter the interior of the chamber;
  b) drive means operatively associated with the chamber so as to rotate the chamber about an axis to thereby cause liquid within the chamber to be displaced against the peripheral wall;
  c) a pitot tube having a first end located within the chamber adjacent to the peripheral wall such that liquid collected on the peripheral wall will pass through the pitot tube as the chamber rotates, and a second end located exteriorly of the chamber and the air-liquid separator;
  d) means operatively associated with the chamber means to draw liquid from the liquid collecting portion of the air-liquid separator into the chamber as the chamber rotates wherein the chamber means has an end wall and wherein the means to draw liquid into the chamber comprises a plurality of radially extending vanes protruding from the end wall into the chamber means; and,
  e) air bleed passage means communicating with the interior of the chamber to allow air to pass from the interior of the chamber means wherein the air bleed passage means is operatively connected with the air discharge tube.

2. The apparatus of claim 1 further comprising a drive shaft operatively connecting the drive means and the chamber, wherein the drive shaft defines a passageway communicating with the interior of the chamber and the air bleed passage means.

3. An air-liquid separating system comprising:
  a) vortex-type air-liquid separator having an air-liquid mixture inlet oriented so as to introduce the air-liquid mixture into the air-liquid separator along a generally tangential path, an air outlet and a sump portion for collecting separated liquid, and,
  b) means to pump the liquid out of the sump portion comprising:
    i) means defining a chamber having a peripheral wall and an interior space in communication with the liquid collecting portion of the air-liquid separator such that liquid in the liquid collecting portion may enter the interior of the chamber;
    ii) drive means operatively associated with the chamber so as to rotate the chamber about an axis to thereby cause liquid within the chamber to be displaced against the peripheral wall; and,
    iii) a pitot tube having a first end located within the chamber adjacent to the peripheral wall such that liquid collected on the peripheral wall will enter and pass through the pitot tube as the chamber rotates, and a second end located exteriorly of the chamber means and the air-liquid separator.

4. The air-liquid separating system of claim 3 further comprising means operatively associated with the chamber means to draw liquid from the liquid collecting portion of the air-liquid separator into the chamber means as the chamber means rotates.

5. The air-liquid separating system of claim 4 wherein the chamber means has an end wall and wherein the means to draw liquid into the chamber means comprises a plurality of radially extending vanes protruding from the end wall into the chamber means.

6. The air-liquid separating system of claim 3 further comprising air bleed passage means communicating with the interior of the chamber means to allow air to pass from the interior of the chamber means.

7. The air-liquid separating system of claim 6 wherein the air-liquid separator has an air discharge tube and wherein the air bleed passage means is operatively connected with the air discharge tube.

8. The air-liquid separating system of claim 6 further comprising a drive shaft operatively connecting the drive means and the chamber means, wherein the drive shaft defines a passageway communicating with the interior of the chamber means and the air bleed passage means.

* * * * *